United States Patent
Igami

(10) Patent No.: US 11,815,659 B2
(45) Date of Patent: Nov. 14, 2023

(54) SPECTACLE LENS, COMPOSITION

(71) Applicant: NIKON-ESSILOR CO., LTD., Tokyo (JP)

(72) Inventor: Yuka Igami, Tokyo (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 0 days.

(21) Appl. No.: 17/610,253

(22) PCT Filed: Apr. 30, 2020

(86) PCT No.: PCT/JP2020/018326
§ 371 (c)(1),
(2) Date: Nov. 10, 2021

(87) PCT Pub. No.: WO2020/230655
PCT Pub. Date: Nov. 19, 2020

(65) Prior Publication Data
US 2022/0244432 A1    Aug. 4, 2022

(30) Foreign Application Priority Data

May 10, 2019    (JP) .................................. 2019-090202

(51) Int. Cl.
*G02B 1/14* (2015.01)
*C09D 7/61* (2018.01)
(Continued)

(52) U.S. Cl.
CPC ................. *G02B 1/14* (2015.01); *C09D 7/61* (2018.01); *C09D 7/63* (2018.01); *C09D 133/10* (2013.01); *G02B 1/041* (2013.01); *G02B 1/11* (2013.01)

(58) Field of Classification Search
CPC . G02B 1/14; G02B 1/041; G02B 1/11; C09D 7/61; C09D 7/63; C09D 133/10
See application file for complete search history.

(56) References Cited

U.S. PATENT DOCUMENTS

| | | | |
|---|---|---|---|
| 8,816,029 B2 * | 8/2014 | Wang ................... | C09D 139/00 526/263 |
| 11,535,766 B2 * | 12/2022 | Shimura ................ | C09D 11/30 |

(Continued)

FOREIGN PATENT DOCUMENTS

| CA | 3048856 | 7/2018 |
|---|---|---|
| JP | 2006-233252 | 9/2006 |

(Continued)

OTHER PUBLICATIONS

Zarif et al. "Ionic liquid coated iron nanoparticles are promising peroxidase mimics for optical determination of H2O2" Microchimica Acta (2018) 185:302 available online May 16, 2018.*

(Continued)

*Primary Examiner* — Robert S Walters, Jr.

(57) ABSTRACT

The present invention provides a spectacle lens having low surface resistivity. This spectacle lens includes a spectacle lens base and a hard coat layer. When a primer layer is included between the spectacle lens base material and the hard coat layer, the primer layer and/or the hard coat layer contains at least one type of electroconductive filler selected from the group consisting of ionic liquid-coated nanowires containing metal nanowires and an ionic liquid coating the metal nanowire, and ionic liquid-coated nanoparticles containing metal nanoparticles and an ionic liquid coating the metal nanoparticles. When the primer layer is not included between the spectacle lens base material and the hard coat layer, the hard coat layer contains the at least one type of electroconductive filler selected from the group consisting of the ionic liquid-coated nanowires and ionic liquid-coated nanoparticles.

11 Claims, 1 Drawing Sheet

(51) Int. Cl.
    *C09D 7/63*     (2018.01)
    *C09D 133/10*     (2006.01)
    *G02B 1/04*     (2006.01)
    *G02B 1/11*     (2015.01)

(56) References Cited

U.S. PATENT DOCUMENTS

2015/0321257 A1      11/2015    Suh et al.
2018/0292677 A1      10/2018    Jan

FOREIGN PATENT DOCUMENTS

| | | |
|---|---|---|
| JP | 2008-184556 | 8/2008 |
| JP | 2009-127092 | 6/2009 |
| JP | 2011-113050 | 6/2011 |
| JP | 2012-209232 | 10/2012 |
| JP | 2012-209232 A | 10/2012 |
| JP | 2015-224294 | 12/2015 |
| JP | 2015-224294 A | 12/2015 |
| JP | 2016-507640 | 3/2016 |
| WO | WO2018/124204 | 7/2018 |

OTHER PUBLICATIONS

Office Action, dated Nov. 22, 2022, in corresponding Japanese Patent Application No. 2021-519374 (8 pp.).
International Search Report, dated Jul. 21, 2020, in corresponding International Patent Application No. PCT/JP2020/018326 (6 pp.).
Chang Min Hwa et al: "N Thin and long silver nanowires self-assembled in ionic liquids as a soft template: electrical and optical properties", Jan. 1, 2014 (Jan. 1, 2014), pp. 1-7, XP093006453, Retrieved from the Internet: URL:https://nanoscalereslett.springeropen.com/counter/pdf/10.1186/1556-276X-9-330.pdf [retrieved on Dec. 9, 2022] (7 pp.).
Extended European Search Report, dated Dec. 21, 2022, in corresponding European Patent Application No. 20805606.9 (8 pp.).
Office Action, dated Jan. 9, 2023, in corresponding Canadian Patent Application No. 3,139,268 (4 pp.).
Korean Office Action dated May 30, 2023 for Korean Application No. 10-2021-7035324.

* cited by examiner

SPECTACLE LENS, COMPOSITION

TECHNICAL FIELD

The present disclosure relates to a spectacle lens and a composition.

BACKGROUND ART

A curable resin composition containing a silsesquioxane compound having a radical polymerizable group is useful as a hard coating agent (for example, Patent Literature 1).

CITATION LIST

Patent Literature

Patent Literature 1: JP 2015-224294 A

SUMMARY OF INVENTION

The present disclosure relates to a spectacle lens including: a spectacle lens base; and a hard coat layer, wherein when a primer layer is included between the spectacle lens base and the hard coat layer, at least one of the primer layer and the hard coat layer contains at least one conductive filler selected from the group consisting of an ionic liquid-coated nanowire containing a metal nanowire and an ionic liquid coating the metal nanowire, and ionic liquid-coated nanoparticles containing metal nanoparticles and an ionic liquid coating the metal nanoparticles, and when the primer layer is not included between the spectacle lens base and the hard coat layer, the hard coat layer contains at least one conductive filler selected from the group consisting of the ionic liquid-coated nanowire and the ionic liquid-coated nanoparticles.

DESCRIPTION OF EMBODIMENTS

Hereinafter, a spectacle lens of the present embodiment will be described in detail.

As the spectacle lens, a spectacle lens having low surface resistivity is desired. In the spectacle lens of the present embodiment, the above characteristic is obtained. As described later, when a conductive filler described later is contained in a hard coat layer in the spectacle lens, scratch resistance when an antireflection film is disposed on the hard coat layer is also excellent. Adhesion between layers adjacent to each other in the spectacle lens is excellent.

In the present specification, the term "to" is used as the meaning including numerical values described before and after the term as the lower and upper limits.

First Embodiment

Figure 1:
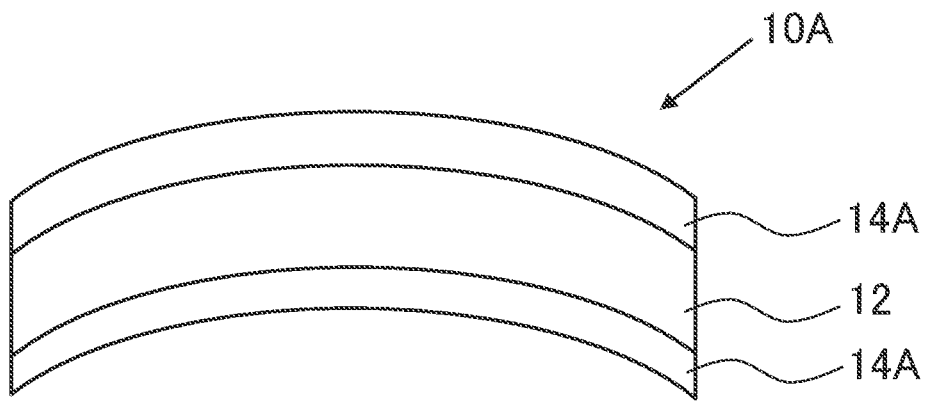
FIG. 1 is a cross-sectional view of a spectacle lens according to a first embodiment.

FIG. 1 is a cross-sectional view of a spectacle lens according to a first embodiment.

A spectacle lens 10A shown in FIG. 1 includes a spectacle lens base 12 and a hard coat layer 14A disposed on each of both surfaces of the spectacle lens base 12.

In FIG. 1, the hard coat layer 14A is disposed in direct contact with the spectacle lens base 12, but the invention is not limited to this form. Another layer (for example, a primer layer) may be disposed between the spectacle lens base 12 and the hard coat layer 14A as described later. That is, the hard coat layer 14A may be directly disposed on the spectacle lens base 12, or may be indirectly disposed on the spectacle lens base 12 with another layer interposed therebetween.

In FIG. 1, the hard coat layer 14A is disposed on each of both the surfaces of the spectacle lens base 12, but the hard coat layer 14A may be disposed only on one surface of the spectacle lens base 12.

In the present embodiment, the hard coat layer 14A contains a predetermined conductive filler described later.

Hereinafter, members included in the spectacle lens 10A will be described in detail.

(Spectacle Lens Base)

The spectacle lens base is a member that supports a hard coat layer described later.

The type of the spectacle lens base is not particularly limited, and examples thereof include a normal spectacle lens base composed of plastic or inorganic glass or the like, and a plastic spectacle lens base is preferable from the viewpoint of excellent handleability.

The type of the plastic spectacle lens base is not particularly limited, and examples thereof include a finished lens obtained by optically finishing both convex and concave surfaces and molding the lens according to a desired power, a semi-finished lens obtained by finishing only a convex surface as an optical surface (a spherical surface, a rotation target aspheric surface, or a progressive-addition surface or the like), and a lens obtained by machining and polishing a concave surface of the semi-finished lens according to a wearer's prescription.

The type of plastic (so-called resin) constituting the plastic spectacle lens base is not particularly limited, and examples thereof include a (meth)acrylic resin, a thiourethane-based resin, an allyl-based resin, an episulfide-based resin, a polycarbonate-based resin, a polyurethane-based resin, a polyester-based resin, a polystyrene-based resin, a polyethersulfone-based resin, a poly-4-methylpentene-1 based resin, and a diethylene glycol bisallyl carbonate-based resin (CR-39).

The thickness of the plastic spectacle lens base is not particularly limited and, in many cases, is about 1 to 30 mm from the viewpoint of handleability.

The refractive index of the plastic spectacle lens base is not particularly limited.

The plastic spectacle lens base may not be transparent as long as it has translucency, and may contain an ultraviolet absorber or a dye that absorbs a specific wavelength region from an ultraviolet region to an infrared region.

(Hard Coat Layer)

The hard coat layer is disposed on the spectacle lens base, and imparts scratch resistance to the spectacle lens base.

The hard coat layer preferably has a pencil hardness of "H" or higher in a test method specified in JIS K5600.

The hard coat layer in the first embodiment contains at least one conductive filler (hereinafter, also simply referred to as a "specific filler") selected from the group consisting of an ionic liquid-coated nanowire containing a metal nanowire and an ionic liquid coating the metal nanowire, and ionic liquid-coated nanoparticles containing metal nanoparticles and an ionic liquid coating the metal nanoparticles.

The type of a metal contained in the metal nanowire in the ionic liquid-coated nanowire is not particularly limited, and from the viewpoint that the surface resistivity of the spectacle lens further decreases (hereinafter, also simply referred to as the "viewpoint of a more excellent predetermined effect"), at least one selected from the group consisting of silver, gold, copper, nickel, and platinum is preferable; silver or gold is more preferable; and silver is still more preferable.

The metal nanowire refers to a conductive substance that is composed of a metal, has a needle shape or a thread shape, and has a diameter of the order of nanometers. The metal nanowire may be linear or may be curved.

The diameter of the metal nanowire is not particularly limited, but is preferably 500 nm or less, more preferably 200 nm or less, still more preferably 100 nm or less, and particularly preferably 50 nm or less, from the viewpoint of a more excellent predetermined effect. In many cases, the lower limit is 10 nm or more.

The diameter of the metal nanowire is an average value, and is determined by observing the cross section of the metal nanowire using a scanning electron microscope or a transmission electron microscope, measuring the diameter of the metal nanowire at 20 points, and arithmetically averaging the diameters. When the shape of the cross section is not a perfect circular shape, the major axis length is taken as the diameter.

The length of the metal nanowire is not particularly limited, but is preferably 5 to 1000 μm, and more preferably 10 to 500 μm, from the viewpoint of a more excellent predetermined effect.

The length of the metal nanowire is an average value. The lengths of 20 metal nanowires are measured using a scanning electron microscope or a transmission electron microscope, and arithmetically averaged to determine the average value.

A ratio of a diameter d of the metal nanowire to a length L thereof (aspect ratio: L/d) is not particularly limited, but is preferably 10 to 100000, and more preferably 50 to 100000.

The methods for measuring the diameter and length of the metal nanowire are as described above.

The type of the ionic liquid contained in the ionic liquid-coated nanowire is not particularly limited, and from the viewpoint of a more excellent predetermined effect, at least one selected from the group consisting of an ammonium salt, an imidazolium salt, a pyridinium salt, a pyrrolidinium salt, a phosphonium salt, and a sulfonium salt is preferable, and an ammonium salt and an imidazolium salt are more preferable.

The ionic liquid is a salt composed of a cation (for example, organic anion) and an anion (for example, organic or inorganic anion), and has a melting point of 100° C. or lower. The ionic liquid is preferably a single ionic liquid that is in a liquid state without being solidified at normal temperature (25° C.) and pressure.

A cation contained in the ammonium salt (preferably, a quaternary ammonium salt) is an ammonium cation (quaternary ammonium cation).

A cation contained in the imidazolium salt is an imidazolium cation.

A cation contained in the pyridinium salt is a pyridinium cation.

A cation contained in the pyrrolidinium salt is a pyrrolidinium cation.

A cation contained in the phosphonium salt is a phosphonium cation.

A cation contained in the sulfonium salt is a sulfonium cation.

An anion contained in the ionic liquid is not particularly limited, and may be, for example, a halide ion, a cyanide ion, a dicyanoamine anion, a trifluoromethanesulfonic acid ion, a nonafluorobutanesulfonic acid ion, a tetrafluoroethanesulfonic acid ion, a lactic acid anion, a salicylic acid ion, a thiosalicylic acid ion, a dibutyl phosphate ion, an acetate ion, a hexafluoroantimonic acid ion, a hydrogen sulfate ion, a sulfate ion, an octylsulfonic acid ion, a tetrachloroaluminate ion, a thiocyanate ion, a tris(trifluoromethylsulfonyl)methide ion, an aminoacetate ion, an aminopropionate ion, a diethyl phosphate ion, a dimethylphosphate ion, an ethylsulfate ion, a methylsulfate ion, a hydroxide ion, bis(trimethylpentyl)phosphinate ion, a decanoate ion, a trifluoroacetate ion, a ferrate ion, a tetrafluoroborate ion, a hexafluorophosphate ion, sulfonylamide, a butanesulfonate ion, a methylsulfonic acid ion, an ethylsulfonic acid ion, a bis(trifluoromethanesulfonyl)imide anion, a bis(trifluoroethanesulfonyl)imide anion, and a bis(pentafluoroethanesulfonyl)imide anion.

The ionic liquid may have a polar group (for example, a hydroxyl group, a mercapto group, an amino group, a carboxyl group, or a sulfoxyl group or the like) in the molecule. The ionic liquid has the polar group, whereby the ionic liquid is likely to be coordinated to the metal nanowire. The ionic liquid has the polar group (in particular, the hydroxyl group), whereby compatibility between the ionic liquid-coated nanowire and another component (for example, a polymerizable monomer) contained in the composition described later is improved.

The ionic liquid is preferably a compound represented by the formula (1), a compound represented by the formula (2), and a compound represented by the formula (3).

[Chemical Formula 1]

(1)

(2)

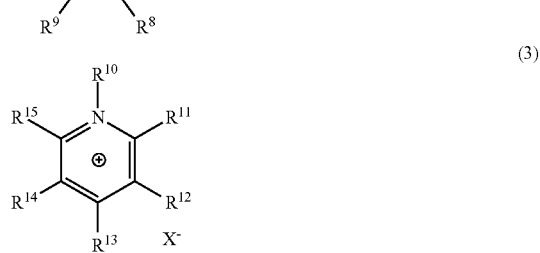

(3)

In the formula (1), $R^1$ to $R^4$ each independently represent an alkyl group that may have a substituent, or a glycol group having an alkyl group that may have a substituent. Two of $R^1$ to $R^4$ may be bonded to each other to form a ring. Examples of the ring to be formed include a piperidine ring and a pyrrolidine ring. Specific examples of the ring to be formed include a pyrrolidyl group, a 2-methylpyrrolidyl group, a 3-methylpyrrolidyl group, a 2-ethylpyrrolidyl group, a 3-ethylpyrrolidyl group, a 2,2-dimethylpyrrolidyl group, a 2,3-dimethylpyrrolidyl group, a piperidyl group, a 2-methylpiperidyl group, a 3-methylpiperidyl group, a 4-methylpiperidyl group, a 2,6-dimethylpiperidyl group, and a 2,2,6,6-tetramethylpiperidyl group.

The number of carbon atoms in the alkyl group is not particularly limited, but is preferably 1 to 20, and more preferably 1 to 6. The alkyl group may be linear, branched, or cyclic. Examples of the alkyl group include a methyl group, an ethyl group, a propyl group, an isopropyl group, a butyl group, an isobutyl group, a sec-butyl group, a tert-butyl group, a pentyl group, a pentyl group, a neopentyl group, a hexyl group, an isohexyl group, a decyl group, a dodecyl group, an octadecyl group, a cyclopentyl group, and a cyclohexyl group.

The type of a substituent with which the alkyl group represented by $R^1$ to $R^4$ may be substituted is not particularly limited, and examples thereof include an aryl group, a nitro group, a cyano group, an alkoxy group, and the above-described polar group.

$X^-$ in the formula (1) represents an anion. Examples of the anion include the groups exemplified for the anion contained in the ionic liquid described above.

In the formula (2), $R^5$ and $R^6$ each independently represent an alkyl group that may have a substituent.

The definition and preferred aspect of the alkyl group represented by $R^5$ and $R^6$ are the same as those of the alkyl group represented by $R^1$ to $R^4$ described above.

Examples of a substituent with which the alkyl group represented by $R^5$ and $R^6$ may be substituted include a substituent with which the alkyl group represented by $R^1$ to $R^4$ may be substituted.

$R^7$ to $R^9$ each independently represent a hydrogen atom, or an alkyl group that may have a substituent.

The definition and preferred aspect of the alkyl group represented by $R^7$ to $R^9$ are the same as those of the alkyl group represented by $R^1$ to $R^4$ described above.

Examples of a substituent with which the alkyl group represented by $R^7$ to $R^9$ may be substituted include a substituent with which the alkyl group represented by $R^1$ to $R^4$ may be substituted.

$X^-$ in the formula (2) represents an anion. Examples of the anion include the groups exemplified for the anion contained in the ionic liquid described above.

In the formula (3), $R^{10}$ represents an alkyl group that may have a substituent.

The definition and preferred aspect of the alkyl group represented by $R^{10}$ are the same as those of the alkyl group represented by $R^1$ to $R^4$ described above.

Examples of a substituent with which the alkyl group represented by $R^{10}$ may be substituted include a substituent with which the alkyl group represented by $R^1$ to $R^4$ may be substituted.

$R^{11}$ to $R^{15}$ each independently represent a hydrogen atom, or an alkyl group that may have a substituent.

The definition and preferred aspect of the alkyl group represented by $R^{11}$ to $R^{15}$ are the same as those of the alkyl group represented by $R^1$ to $R^4$ described above.

Examples of a substituent with which the alkyl group represented by $R^{11}$ to $R^{15}$ may be substituted include a substituent with which the alkyl group represented by $R^1$ to $R^4$ may be substituted.

$X^-$ in the formula (3) represents an anion. Examples of the anion include the groups exemplified for the anion contained in the ionic liquid described above.

In the ionic liquid-coated nanowire, the ionic liquid coats the metal nanowire. That is, the ionic liquid is disposed on the metal nanowire so as to coat the metal nanowire. The ionic liquid is likely to interact with (for example, be coordinately bonded to) the metal nanowire. As described later, the ionic liquid-coated nanowire is obtained by mixing both the ionic liquid and the metal nanowire under a predetermined condition.

Examples of a method for confirming the presence of the ionic liquid-coated nanowire include a method in which an absorption spectrum of a solution containing the ionic liquid-coated nanowire is measured to confirm absorption characteristics derived from the ionic liquid-coated nanowire. Other examples thereof include a method in which the ionic liquid-coated nanowire is subjected to energy dispersive X-ray analysis (EDX), and an element derived from the ionic liquid is detected around the metal nanowire to confirm the presence of the ionic liquid-coated nanowire.

The type of a metal contained in the metal nanoparticles in the ionic liquid-coated nanoparticles is not particularly limited, but is preferably at least one selected from the group consisting of silver, gold, copper, nickel, and platinum, and more preferably silver or gold, from the viewpoint of a more excellent predetermined effect.

The metal nanoparticles refer to a conductive substance that is composed of a metal, and has a particulate shape.

The average particle size of the metal nanoparticles is not particularly limited, but is preferably 1 to 500 nm, and more preferably 5 to 100 nm, from the viewpoint of a more excellent predetermined effect.

The average particle size is determined by measuring the diameters of 20 or more metal particles with a transmission electron microscope and arithmetically averaging the diameters. When the shape of the metal nanoparticles is not a perfect circular shape, the major axis length is taken as the diameter.

Examples of the ionic liquid contained in the ionic liquid-coated nanoparticles include the compounds exemplified for the ionic liquid contained in the ionic liquid-coated nanowire described above.

As described above, the ionic liquid may have a polar group (for example, a hydroxyl group, a mercapto group, an amino group, a carboxyl group, or a sulfoxyl group or the like) in the molecule. The ionic liquid has the polar group, whereby the ionic liquid is likely to be coordinated to the metal nanoparticles. The ionic liquid has the polar group (in particular, the hydroxyl group), whereby compatibility between the ionic liquid-coated nanoparticles and another component (for example, a polymerizable monomer) contained in the composition described later is improved.

In the ionic liquid-coated nanoparticles, the ionic liquid coats the metal nanoparticles. That is, the ionic liquid is disposed on the metal nanoparticles so as to coat the metal nanowire. The ionic liquid is likely to interact with (for example, be coordinately bonded to) the metal nanoparticles, and as described later, the ionic liquid-coated nanoparticles are obtained by mixing both the ionic liquid and the metal nanoparticles under a predetermined condition.

Examples of a method for confirming the presence of the ionic liquid-coated nanoparticles include a method in which the absorption spectrum of a solution containing the ionic liquid-coated nanoparticles is measured to confirm absorption characteristics derived from the ionic liquid-coated nanoparticles. Other examples thereof include a method in which the ionic liquid-coated nanoparticles are subjected to energy dispersive X-ray analysis (EDX), and an element derived from the ionic liquid is detected around the metal nanoparticles to confirm the presence of the ionic liquid-coated nanoparticles.

A method for producing the specific filler (the ionic liquid-coated nanowire and the ionic liquid-coated nanoparticles) is not particularly limited, and examples thereof include a method in which a metal nanowire or metal nanoparticles are mixed with an ionic liquid, followed by heating.

For a heating condition, an optimum condition is selected depending on the type of an ionic liquid to be used, and by heating at a temperature of 70° C. or higher (preferably, heating for 1 hour or more), the specific filler to be uniformly dispersed in various solvents including an alcohol can be obtained.

The above method may be performed in the presence of a solvent as necessary. Examples thereof include a method in which a metal nanowire or metal nanoparticles, an ionic liquid, and a solvent are mixed, followed by heating.

A mixing mass ratio between the metal nanowire or the metal nanoparticles and the ionic liquid (the mass of the metal nanowire or metal nanoparticles/the mass of the ionic liquid) is not particularly limited, but is preferably 0.5 to 5, and more preferably 1.0 to 2.5.

Examples of the solvent include water and an organic solvent. The type of the organic solvent is not particularly limited, and examples thereof include alcohol-based solvents (for example, ethanol), ketone-based solvents, ether-based solvents, ester-based solvents, hydrocarbon-based solvents, halogenated hydrocarbon-based solvents, amide-based solvents, sulfone-based solvents, and sulfoxide-based solvents.

When the above method is performed, the method may be performed in the presence of an acid as necessary.

Examples of the acid to be used include nitric acid, hydrochloric acid, and sulfuric acid.

When the hard coat layer containing the specific filler is formed, use may be made of a residue (a solid containing the specific filler, or a mixed solution of the specific filler and the ionic liquid) obtained by subjecting a mixture containing a metal nanowire or metal nanoparticles, an ionic liquid, and a solvent (and an acid as necessary) to a heat treatment to remove the solvent. That is, the hard coat layer may contain the residue.

The hard coat layer may contain an ionic liquid not coating the metal nanowire or the metal nanoparticles.

The hard coat layer may contain the metal nanowire or the metal nanoparticles that are not coated with the ionic liquid.

The total content of the metal nanowire and the metal nanoparticles in the hard coat layer is not particularly limited, but is preferably 1.0 to 50% by mass, more preferably 2.0 to 30% by mass, and still more preferably 3.0 to 10% by mass, with respect to the total mass of the hard coat layer, from the viewpoint of a more excellent predetermined effect.

The "total content of the metal nanowire and the metal nanoparticles in the hard coat layer" is the total of the total content of the metal nanowire and the metal nanoparticles derived from the specific filler and the total content of the metal nanowire and the metal nanoparticles that are not coated with the ionic liquid.

The content of the ionic liquid in the hard coat layer is not particularly limited, but is preferably 0.5 to 20% by mass, and more preferably 1.0 to 10% by mass, with respect to the total mass of the hard coat layer, from the viewpoint of a more excellent predetermined effect.

The "content of the ionic liquid in the hard coat layer" is the total of the content of the ionic liquid derived from the specific filler and the content of the ionic liquid not contained in the specific filler.

The hard coat layer in the first embodiment may contain another component than the specific filler.

Examples of another component include a polymer of a polymerizable monomer (a polymer obtained by polymerizing a polymerizable monomer) in the hard coat layer.

The polymerizable monomer is not particularly limited, but examples thereof include a specific (meth)acrylate, a silsesquioxane having a radical polymerizable group, and a polyfunctional acrylate, as described later. Among them, the hard coat layer preferably contains a polymer obtained by polymerizing a polymerizable monomer containing three kinds of a specific (meth)acrylate, a silsesquioxane having a radical polymerizable group, and a polyfunctional acrylate.

The hard coat layer may contain metal oxide particles described later.

A method for forming the hard coat layer is not particularly limited, and examples thereof include a method in which the hard coat layer is formed by using a hard coat layer-forming composition containing a specific filler. Among them, a method in which a hard coat layer-forming composition containing a polymerizable monomer and a specific filler is used is preferable.

The form of the hard coat layer-forming composition will be described in detail later.

Examples of the method for forming the hard coat layer include a method in which a hard coat layer-forming composition is applied onto a spectacle lens base to form a coating film, and the coating film is subjected to a curing treatment such as a light irradiation treatment.

After the formation of the coating film, a drying treatment such as a heat treatment may be performed to remove a solvent from the coating film as necessary.

When a primer layer is disposed on the spectacle lens base, examples of the method for forming the hard coat layer include a method in which a hard coat layer-forming composition is applied onto the primer layer to form a coating film, and the coating film is subjected to a curing treatment such as a light irradiation treatment.

A method for applying the hard coat layer-forming composition onto the spectacle lens base is not particularly limited, and examples thereof include known methods (for example, a dipping coating method, a spin coating method, a spray coating method, an inkjet coating method, and a flow coating method). For example, when the dipping coating method is used, the spectacle lens base is immersed in the hard coat layer-forming composition, then pulled out, and dried, whereby a coating film having a predetermined film thickness can be formed on the spectacle lens base.

The film thickness of the coating film formed on the spectacle lens base is not particularly limited, and appropriately selected to allow the hard coat layer to have a predetermined film thickness.

The conditions for the light irradiation treatment are not particularly limited, and suitable conditions are selected depending on the type of a polymerization initiator to be used.

The type of light for light irradiation is not particularly limited, but examples thereof include ultraviolet rays and visible rays. Examples of a light source include a high-pressure mercury lamp.

The cumulative amount of light during light irradiation is not particularly limited, but is preferably 100 to 5000 $mJ/cm^2$, and more preferably 100 to 2000 $mJ/cm^2$, from the viewpoint of productivity and curability of the coating film.

The film thickness of the hard coat layer is not particularly limited, but is preferably 1 µm or more, more preferably 5 µm or more, and still more preferably 10 µm or more. The upper limit of the film thickness may be, for example, 30 µm or less.

The film thickness is an average film thickness, and determined by measuring the film thickness of the hard coat layer at optional 5 points and arithmetically averaging the film thicknesses, as the measuring method of the film thickness.

(Another Member)

The spectacle lens according to the first embodiment may include another member than the spectacle lens base and the hard coat layer as described above.

Examples of another member include a primer layer and an antireflection film.

The primer layer is disposed between the spectacle lens base and the hard coat layer, and improves the adhesion of the hard coat layer to the spectacle lens base and imparts impact resistance to the spectacle lens base.

A material constituting the primer layer is not particularly limited, and known materials can be used. For example, a resin is mainly used. The type of the resin to be used is not particularly limited, and preferable examples thereof include a polyurethane-based resin, an epoxy-based resin, a phenol-based resin, a polyimide-based resin, a polyester-based resin, a bismaleimide-based resin, and a polyolefin-based resin, and a polyurethane-based resin is preferable.

The primer layer may contain another component than the resin.

Examples of another component include oxide fine particles of at least one metal selected from Si, Al, Sn, Sb, Ta, Ce, La, Fe, Zn, W, Zr, In, and Ti, composite oxide fine particles thereof, a hydrolyzable silicon compound and/or a hydrolysis condensate thereof, the specific filler described above, and a surfactant.

The primer layer may contain the specific filler. That is, both the primer layer and the hard coat layer may contain the specific filler.

Suitable ranges of the total content of the metal nanowire and the metal nanoparticles in the primer layer and the content of the ionic liquid in the primer layer include ranges described in a second embodiment described later.

A method for forming the primer layer is not particularly limited, and known methods can be employed. Examples thereof include a method in which a primer layer-forming composition containing a predetermined resin is applied onto a spectacle lens base, and subjected to a curing treatment as necessary to form the primer layer.

The method for applying the primer layer-forming composition is not particularly limited, and examples thereof include the methods exemplified for the method for applying the hard coat layer-forming composition onto the spectacle lens base.

The thickness of the primer layer is not particularly limited, and is preferably 0.3 to 2 μm.

The spectacle lens may further include an antireflection film disposed on the hard coat layer.

The antireflection film has a function of preventing the reflection of incident light. Specifically, the antireflection film can have low reflection characteristics (wide-band low reflection characteristics) over the entire visible range of 400 to 780 nm.

The structure of the antireflection film is not particularly limited, and may be a single layer structure or a multilayer structure.

The antireflection film is preferably an inorganic antireflection film. The inorganic antireflection film is an antireflection film composed of an inorganic compound.

In the case of the multilayer structure, it is preferable to have a structure in which low refractive index layers and high refractive index layers are alternately laminated.

Examples of a material constituting the high refractive index layer include oxides of titanium, zirconium, aluminum, niobium, tantalum, and lanthanum. Examples of a material constituting the low refractive index layer include an oxide of silica.

A method for producing the antireflection film is not particularly limited, but examples thereof include dry methods such as a vacuum vapor deposition method, a sputtering method, an ion plating method, an ion beam assist method, and a CVD method.

Second Embodiment

Figure 2:
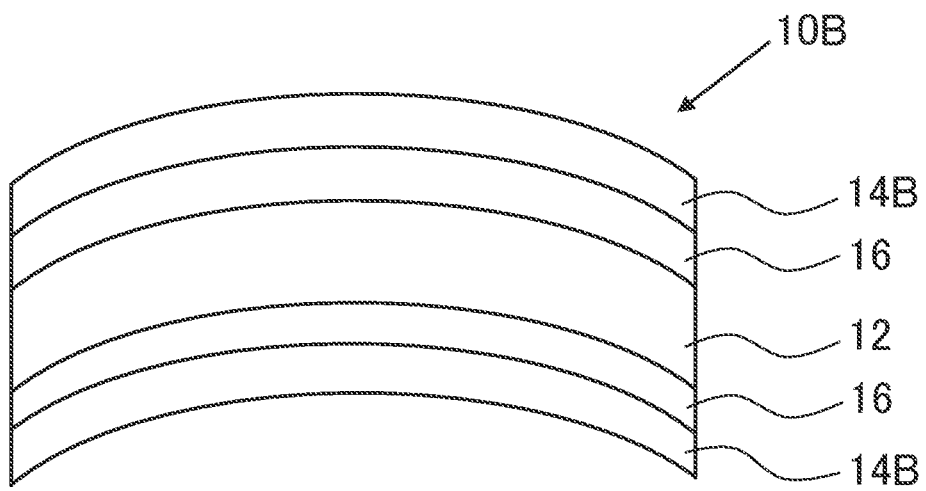
FIG. 2 is a cross-sectional view of a spectacle lens according to a second embodiment.

FIG. 2 is a cross-sectional view of a spectacle lens according to a second embodiment.

A spectacle lens 10B shown in FIG. 2 includes a spectacle lens base 12, a primer layer 16 disposed on each of both surfaces of the spectacle lens base 12, and a hard coat layer 14B disposed on the primer layer 16.

In FIG. 2, the primer layer 16 and the hard coat layer 14B are disposed on each of both surfaces of the spectacle lens base 12, but the primer layer 16 and the hard coat layer 14B may be disposed only on one surface of the spectacle lens base 12.

In the present embodiment, the primer layer 16 contains the specific filler described above. The hard coat layer 14B does not contain the specific filler.

Hereinafter, members included in the spectacle lens 10B will be described in detail.

Since the spectacle lens base included in the spectacle lens according to the second embodiment is the same as the spectacle lens included in the spectacle lens according to the first embodiment described above, the description thereof will be omitted.

Since the hard coat layer included in the spectacle lens according to the second embodiment and the hard coat layer included in the spectacle lens according to the first embodiment described above have the same form except that no specific filler is contained in the hard coat layer included in the spectacle lens according to the second embodiment, the description thereof will be omitted.

Since the primer layer included in the spectacle lens according to the second embodiment has the same form as that of the primer layer that may be included in the spectacle lens according to the second embodiment described above except that the specific filler is contained in the primer layer included in the spectacle lens according to the second embodiment, only differences between the primer layers will be described in detail below.

The primer layer of the spectacle lens according to the second embodiment contains the above-described specific filler (the ionic liquid-coated nanowire, the ionic liquid-coated nanoparticles). The specific filler is as described above.

The primer layer may contain another component than the specific filler. Examples of another component include the resins described in the spectacle lens according to the first embodiment.

The primer layer may contain an ionic liquid not coating a metal nanowire or metal nanoparticles.

The primer layer may contain the metal nanowire or the metal nanoparticles that are not coated with the ionic liquid.

The total content of the metal nanowire and the metal nanoparticles in the primer layer is not particularly limited, but is preferably 1.0 to 50% by mass, more preferably 2.0 to 30% by mass, and still more preferably 3.0 to 10% by mass, with respect to the total mass of the primer layer, from the viewpoint of a more excellent predetermined effect.

The "total content of the metal nanowire and the metal nanoparticles in the primer layer" is the total of the total content of the metal nanowire and the metal nanoparticles derived from the specific filler and the total content of the metal nanowire and the metal nanoparticles that are not coated with the ionic liquid.

The content of the ionic liquid in the primer layer is not particularly limited, but is preferably 0.5 to 20% by mass, and more preferably 1.0 to 10% by mass, with respect to the total mass of the primer layer, from the viewpoint of a more excellent predetermined effect.

The "content of the ionic liquid in the primer layer" is the total of the content of the ionic liquid derived from the specific filler and the content of the ionic liquid not contained in the specific filler.

A method for forming the primer layer is not particularly limited, and examples thereof include a method in which the primer layer-forming composition containing the specific filler and the resin described above is used.

The first embodiment includes the following three forms:

Form 1A: a spectacle lens including a spectacle lens base and a hard coat layer disposed on the spectacle lens base, the hard coat layer containing a specific filler;

Form 1B: a spectacle lens including a spectacle lens base, a primer layer disposed on the spectacle lens base, and a hard coat layer disposed on the primer layer, the hard coat layer containing a specific filler; and Form 1C: a spectacle lens including a spectacle lens base, a primer layer disposed on the spectacle lens base, and a hard coat layer disposed on the primer layer, both the primer layer and the hard coat layer containing a specific filler.

The second embodiment corresponds to a spectacle lens including a spectacle lens base, a primer layer disposed on the spectacle lens base, and a hard coat layer disposed on the primer layer, the primer layer containing a specific filler.

<Composition>

A layer containing a specific filler (for example, a hard coat layer containing a specific filler, and a primer layer containing a specific filler) can be formed by using a composition containing the specific filler.

For example, the hard coat layer containing the specific filler can be formed by using a composition containing a polymerizable monomer and the specific filler (hard coat layer-forming composition). The primer layer containing the specific filler can be formed by using a composition containing a resin and the specific filler (primer layer-forming composition).

Hereinafter, the hard coat layer-forming composition will be described in more detail.

((Meth)Acrylate Having at Least One Group Selected from the Group Consisting of Phosphate Group and Sulfonate Group)

Examples of the polymerizable monomer that may be contained in the hard coat layer-forming composition include a (meth)acrylate (hereinafter, also simply referred to as a "specific (meth)acrylate") having at least one group (hereinafter, also simply referred to as a "specific group") selected from the group consisting of a phosphate group and a sulfonate group.

The (meth)acrylate means an acrylate or a methacrylate.

The specific group is preferably a phosphate group.

The number of the specific groups in the specific (meth) acrylate may be 1 or more, and may also be 2 or more. The upper limit may be, for example, 5 or less.

The specific (meth)acrylate may be monofunctional or polyfunctional. The term "polyfunctional" means that the specific (meth)acrylate has two or more specific groups.

The phosphate group is a group represented by the following formula. * represents a bonding position.

[Chemical Formula 2]

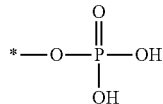

The sulfonate group is a group represented by the following formula.

[Chemical Formula 3]

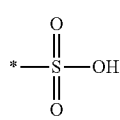

The specific (meth)acrylate is preferably a compound represented by the formula (A).

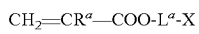

$R^a$ represents a hydrogen atom or a methyl group.

$L^a$ represents a divalent hydrocarbon group that may contain a hetero atom (for example, an oxygen atom, a nitrogen atom, or a sulfur atom). The number of carbon atoms in the divalent hydrocarbon group is not particularly limited, and is preferably 1 to 10 (preferably 1 to 5, and more preferably 1 to 3). Examples of the divalent hydrocarbon group include an alkylene group, an alkenylene group, an alkynylene group, an arylene group, and a combination of these groups, and an alkylene group that may contain a hetero atom (for example, an —O— alkylene group or an alkylene group) is preferable.

X represents a group selected from the group consisting of a phosphate group and a sulfonate group.

(Silsesquioxane Having Radical Polymerizable Group)

Examples of the polymerizable monomer that may be contained in the hard coat layer-forming composition include a silsesquioxane having a radical polymerizable group.

The radical polymerizable group is preferably a group having an ethylenically unsaturated bond. Examples of the group having an ethylenically unsaturated bond include a (meth)acryloyl group, a styryl group, and a vinyl group.

The (meth)acryloyl group means an acryloyl group or a methacryloyl group.

Typically, the silsesquioxane compound is a silane compound having a basic skeleton represented by the formula (B), and obtained by hydrolyzing a trifunctional silane compound such as alkoxysilane, chlorosilane, or silanol. Known examples of the structure of the silsesquioxane compound include, in addition to an irregular form called a random structure, a ladder structure, a cage type (completely condensed cage type) structure, and an incomplete cage type structure (which is a partially cleaved structure of a cage type structure; e.g., a structure lacking a part of silicon atoms in the cage type structure, and a structure in which a silicon-oxygen bond is cleaved in a part of the cage type structure).

In the following formula (B), $R^b$ represents an organic group.

  Formula (B):

$$R^b\text{—}SiO_{3/2}$$

The structure of the silsesquioxane compound having a radical polymerizable group is not particularly limited, but may be any of the random structure, the ladder structure, the cage type structure, and the incomplete cage type structure, or may be a mixture of a plurality of structures.

The equivalent of the radical polymerizable group contained in the silsesquioxane compound is not particularly limited, but is preferably 30 to 500 g/eq., and more preferably 30 to 150 g/eq. because the hardness of the hard coat layer is more excellent.

The silsesquioxane compound having a radical polymerizable group may be synthesized by a known method, or a commercially available product may be used.

(Polyfunctional Acrylate)

Examples of the polymerizable monomer that may be contained in the hard coat layer-forming composition include a polyfunctional (meth)acrylate different from any of a specific (meth)acrylate and a silsesquioxane having a radical polymerizable group.

The polyfunctional (meth)acrylate is a compound having a plurality of (meth)acryloyl groups. The number of the (meth)acryloyl groups is not particularly limited, but is preferably 2 to 6, and more preferably 2 to 3.

The polyfunctional (meth)acrylate is preferably a compound represented by the formula (C).

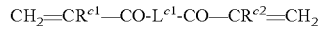  Formula (C):

$$CH_2\!=\!CR^{c1}\text{—}CO\text{-}L^{c1}\text{-}CO\text{—}CR^{c2}\!=\!CH_2$$

$R^{c1}$ and $R^{c2}$ each independently represent a hydrogen atom or a methyl group.

$L^{c1}$ represents a divalent hydrocarbon group that may contain a hetero atom (for example, an oxygen atom, a nitrogen atom, or a sulfur atom). The number of carbon atoms in the divalent hydrocarbon group is not particularly limited, and is preferably 1 to 10. Examples of the divalent hydrocarbon group include an alkylene group, an alkenylene group, an alkynylene group, an arylene group, and a combination of these groups, and an alkylene group that may contain a hetero atom is preferable.

Among them, an alkylene group containing an oxygen atom is preferable, and a group represented by —O-$(L^{c2}$-O$)_m$— is preferable. $L^{c2}$ represents an alkylene group (preferably, the number of carbon atoms is 1 to 3). m represents an integer of 1 or more, preferably an integer of 1 to 10, and more preferably an integer of 2 to 5.

(Metal Oxide Particles)

The hard coat layer-forming composition may contain metal oxide particles.

The type of the metal oxide particles is not particularly limited, and examples thereof include known metal oxide particles. Examples of the metal oxide particles include particles of an oxide of at least one metal selected from Si, Al, Sn, Sb, Ta, Ce, La, Fe, Zn, W, Zr, In, and Ti. Among them, the metal oxide particles are preferably particles of a Si-containing oxide (silicon oxide particles), particles of a Sn-containing oxide (tin oxide particles), particles of a Zr-containing oxide (zirconium oxide particles), or particles of a Ti-containing oxide (titanium oxide particles) from the viewpoint of handleability.

The metal oxide particles may contain, among the metals exemplified above, only one metal (metal atom), or two or more metals (metal atoms).

Si (silicon) may be classified as a semi-metal, but Si is included in the metal in the present specification.

The average particle size of the metal oxide particles is not particularly limited, but is, for example, preferably 1 to 200 nm, and more preferably 5 to 30 nm. When the average particle size is within the above range, the dispersion stability of the metal oxide particles in the hard coat layer-forming composition is more excellent, and the whitening of the cured product can be further suppressed.

The average particle size is determined by measuring the diameters of 20 or more metal oxide particles with a transmission electron microscope and arithmetically averaging the diameters. When the metal oxide particles do not have a perfect circular shape, the major axis length is taken as the diameter.

Various functional groups may be introduced to the surfaces of the metal oxide particles as necessary.

(Another Component)

The hard coat layer-forming composition may contain another component than the above-described components (the specific (meth)acrylate, the silsesquioxane compound having a radical polymerizable group, and the metal oxide particles).

The hard coat layer-forming composition may contain a radical polymerization initiator. Examples of the radical polymerization initiator include a photoradical polymerization initiator and a heat radical polymerization initiator.

Examples of the radical polymerization initiator include IRGACURE 127, 184, 07, 651, 1700, 1800, 819, 369, and 261, TPO, and DAROCUR 1173 manufactured by BASF AG, ESACURE KIP150 and TZT manufactured by Nihon SiberHegner K.K., and KAYACURE BMS and KAYACURE DMBI manufactured by Nippon Kayaku Co., Ltd.

The hard coat layer-forming composition may contain a solvent.

The solvent may be water or an organic solvent.

The type of the organic solvent is not particularly limited, and examples thereof include an alcohol-based solvent, a ketone-based solvent, an ether-based solvent, an ester-based solvent, a hydrocarbon-based solvent, a halogenated hydrocarbon-based solvent, an amide-based solvent, a sulfone-based solvent, and a sulfoxide-based solvent.

The hard coat layer-forming composition may contain various additives such as an ultraviolet absorber, an antiaging agent, a coating film adjusting agent, a light stabilizer, an antioxidant, a coloration preventing agent, a dye, a filler, and an internal mold release agent as necessary.

A method for producing the hard coat layer-forming composition is not particularly limited, and for example, the above-described components may be mixed at one time or in separate steps.

The content of the specific filler in the hard coat layer-forming composition is not particularly limited, but is preferably 1.0 to 30% by mass, and more preferably 3.0 to 20% by mass, with respect to the total solid content (hard coat layer constituent component) in the hard coat layer-forming composition, from the viewpoint of a more excellent predetermined effect.

The total solid content (hard coat layer constituent component) is a component that forms a hard coat layer through a curing treatment, and corresponds to the specific filler, the specific (meth)acrylate, the silsesquioxane compound having a radical polymerizable group, the metal oxide particles, the polyfunctional (meth)acrylate, and the radical polymerization initiator and the like described above. The solvent is not included in the solid content. Even if a component is a liquid, this component is calculated as a solid content as long as this is a component constituting a hard coat layer.

When the specific (meth)acrylate is contained in the hard coat layer-forming composition, the content of the specific (meth)acrylate in the hard coat layer-forming composition is not particularly limited, but is preferably 1 to 30% by mass, and more preferably 5 to 20% by mass, with respect to the total solid content (hard coat layer constituent component) in the hard coat layer-forming composition, from the viewpoint of a more excellent predetermined effect.

When the hard coat layer-forming composition contains the silsesquioxane compound having a radical polymerizable group, the content of the silsesquioxane compound having a radical polymerizable group in the hard coat layer-forming composition is not particularly limited, but is preferably 5 to 85% by mass, and more preferably 10 to 50% by mass, with respect to the total solid content in the hard coat layer-forming composition, from the viewpoint of a more excellent predetermined effect.

The content of the metal oxide particles in the hard coat layer-forming composition is not particularly limited, but is preferably 10 to 90% by mass, and more preferably 25 to 80% by mass, with respect to the total solid content in the hard coat layer-forming composition, from the viewpoint of a more excellent predetermined effect.

When the polyfunctional (meth)acrylate is contained in the hard coat layer-forming composition, the content of the polyfunctional (meth)acrylate is not particularly limited, but is preferably 1 to 20% by mass, and more preferably 3 to 10% by mass, with respect to the total solid content in the hard coat layer-forming composition, from the viewpoint of a more excellent predetermined effect.

When the hard coat layer-forming composition contains the radical polymerization initiator, the content of the radical polymerization initiator is not particularly limited, but is preferably 0.05 to 5% by mass, and more preferably 0.1 to 3% by mass, with respect to the total solid content in the hard coat layer-forming composition, from the viewpoint of a more excellent predetermined effect.

EXAMPLES

Hereinafter, the above embodiments will be described in more detail with reference to Examples and Comparative Examples, but are not limited by these Examples at all.

Comparative Example A1

(Formation of Primer Layer)
Pure water (289 parts by mass), propylene glycol monomethyl ether (10.6 parts by mass), and L77 (manufactured by Momentive) (0.2 parts by mass) and L7604 (manufactured by Dow Chemical Company) (0.2 parts by mass) as surfactants were added to an aqueous urethane dispersion (EVAFANOL HA170, manufactured by Nikka Chemical Co., Ltd., solid content concentration: 37%) (200 parts by mass), followed by stirring to prepare a primer layer-forming composition 1 having a solid content concentration of 14.8% by mass.

As a plastic spectacle lens base, a lens having a refractive index of 1.60 (Nikon Lite 3AS material S0.00D, manufactured by Nikon-Essilor Co., Ltd.) was used.

The plastic spectacle lens base was dipped in the primer layer-forming composition 1 at 90 mm/min, and fired at 90° C. for 20 minutes to form a primer layer.
(Formation of Hard Coat Layer)
Acid phosphoxyethyl methacrylate (Phosmer M, manufactured by UNICHEMICAL CO., LTD.) (6 parts by mass), methacrylic silsesquioxane (AC-SQ TA-100, manufactured by Toagosei Co., Ltd.) (15 parts by mass) as a silsesquioxane having a radical polymerizable group, a zirconium dioxide dispersion liquid (manufactured by Kanto Denka Kogyo Co., Ltd.) (185 parts by mass) (40% by mass zirconium dioxide nanoparticles/propylene glycol monomethyl ether dispersion liquid, zirconium dioxide solid content (74 parts by mass)) as metal oxide particles, polyethylene glycol dimethacrylate (LIGHT-ACRYLATE 4EG-A, manufactured by Kyoeisha Chemical Co., Ltd.) (5 parts by mass), IRGACURE 127 (photopolymerization initiator, manufactured by BASF AG) (3 parts by mass), and an OH functional group-containing ionic liquid IL-OH2 (1-(hydroxypropyl)pyridinium=bis(trifluoromethanesulfonyl)imide, manufactured by Koei Chemical Co., Ltd.) (2 parts by mass) were mixed to obtain a hard coat layer-forming composition C1.

The hard coat layer-forming composition C1 (1.5 ml) was dropped on the primer layer, and the plastic spectacle lens base to which the hard coat layer-forming composition C1 had been applied was then rotated at 1000 rpm for 10 seconds by spin coating. Next, the obtained plastic spectacle lens base was heated at 90° C. for 10 minutes, and the coating film was then irradiated with UV (cumulative amount of light: 1.6 J/cm$^2$) using a high-pressure mercury lamp (100 mW/cm$^2$) as a light source to form a hard coat layer.

The other surface of the plastic spectacle lens base was also subjected to the same treatment as described above to obtain a spectacle lens including the hard coat layer disposed on each of both surfaces of the plastic spectacle lens base.

Comparative Example A2

A spectacle lens was obtained according to the same procedure as in Comparative Example A1 except that a silver nanowire of a silver nanowire solution (excluding a solvent) (ACS Materials, Agnw-L30) (5 parts by mass) was used in place of an OH functional group-containing ionic liquid IL-OH2 (2 parts by mass).

The phrase "silver nanowire of a silver nanowire solution (excluding a solvent) is used" means that a solution is entirely removed from a commercially available silver nanowire solution and the remaining silver nanowire is used.

The silver nanowire had a diameter of 30 nm and a length of 100 to 200 μm.

Comparative Example A3

A spectacle lens was obtained according to the same procedure as in Comparative Example A1 except that an OH functional group-containing ionic liquid IL-OH2 (2 parts by mass) and a silver nanowire of a silver nanowire solution (excluding a solvent) (ACS Materials, Agnw-L30) (5 parts by mass) were used in place of an OH functional group-containing ionic liquid IL-OH2 (2 parts by mass).

In Comparative Example A3, the ionic liquid and the silver nanowire are used, but the ionic liquid does not coat the silver nanowire.

Example A1

A primer layer was formed according to the same procedure as in Comparative Example A1.

A silver nanowire isopropanol solution (concentration: 20 mg/ml, 10 parts by mass) (ACS Materials, Agnw-L30), a 1 mol/m nitric acid aqueous solution (10 parts by mass), and an OH functional group-containing ionic liquid IL-OH2 (0.08 parts by mass) were mixed, and stirred at 75° C. for 1 hour. Next, isopropanol and water were entirely evaporated from the obtained solution to obtain an ionic liquid-coated silver nanowire 1 as a residue.

Acid phosphoxyethyl methacrylate (Phosmer M, manufactured by UNICHEMICAL CO., LTD.) (6 parts by mass), methacrylic silsesquioxane (AC-SQ TA-100, manufactured by Toagosei Co., Ltd.) (15 parts by mass) as a silsesquioxane having a radical polymerizable group, a zirconium dioxide dispersion liquid (manufactured by Kanto Denka Kogyo Co., Ltd.) (185 parts by mass) (40% by mass zirconium dioxide nanoparticles/propylene glycol monomethyl ether dispersion liquid, zirconium dioxide solid content (74 parts by mass)) as metal oxide particles, polyethylene glycol dimethacrylate (LIGHT-ACRYLATE 4EG-A, manufactured by Kyoeisha Chemical Co., Ltd.) (5 parts by mass), IRGACURE 127 (photopolymerization initiator, manufactured by BASF AG) (3 parts by mass), and an ionic liquid-coated silver nanowire 1 (7 parts by mass) were mixed to obtain a hard coat layer-forming composition 1.

The hard coat layer-forming composition 1 (1.5 ml) was dropped on the primer layer, and the plastic spectacle lens base to which the hard coat layer-forming composition 1 had been applied was then rotated at 1000 rpm for 10 seconds by spin coating. Next, the obtained plastic spectacle lens base was heated at 90° C. for 10 minutes, and the coating film was then irradiated with UV (cumulative amount of light: 1.6 J/cm$^2$) using a high-pressure mercury lamp (100 mW/cm$^2$) as a light source to form a hard coat layer.

The other surface of the plastic spectacle lens base was also subjected to the same treatment as described above to obtain a spectacle lens including the hard coat layer disposed on each of both surfaces of the plastic spectacle lens base.

Example A2

A spectacle lens was obtained according to the same procedure as in Example A1 except that a metal concentration and an ionic liquid concentration were adjusted as described in Table 1 using an ionic liquid-coated nanowire 2 obtained by a method described later in place of an ionic liquid-coated silver nanowire 1.
(Production of Ionic Liquid-Coated Silver Nanowire 2)

A silver nanowire isopropanol solution (concentration: 20 mg/ml, 10 parts by mass) (ACS Materials, Agnw-L30), a 1 mol/l nitric acid aqueous solution (10 parts by mass), and an OH functional group-containing ionic liquid IL-OH2 (0.2 parts by mass) were mixed, and stirred at 75° C. for 1 hour. Next, isopropanol and water were entirely evaporated from the obtained solution to obtain an ionic liquid-coated silver nanowire 2 as a residue.

Example A3

A spectacle lens was obtained according to the same procedure as in Example A1 except that a metal concentration and an ionic liquid concentration were adjusted as described in Table 1 using an ionic liquid-coated silver nanowire 3 obtained by a method described later in place of an ionic liquid-coated silver nanowire 1.
(Production of Ionic Liquid-Coated Silver Nanowire 3)

A silver nanowire isopropanol solution (concentration: 20 mg/ml, 10 parts by mass) (ACS Materials, Agnw-L30), a 1 mol/l nitric acid aqueous solution (10 parts by mass), and an OH functional group-containing ionic liquid IL-OH2 (0.4 parts by mass) were mixed, and stirred at 75° C. for 1 hour. Next, isopropanol and water were entirely evaporated from the obtained solution to obtain an ionic liquid-coated silver nanowire 3 as a residue.

Example A4

A spectacle lens was obtained according to the same procedure as in Example A1 except that an OH functional group-containing ionic liquid IL-OH8 (di(ethylene glycol 1-oxyethyl)alkylmethylammonium=bis(trifluoromethane-sulfonyl)imide (manufactured by Koei Chemical Co., Ltd.)) (0.08 parts by mass) was used in place of an OH functional group-containing ionic liquid IL-OH2.

Example A5

A spectacle lens was obtained according to the same procedure as in Example A2 except that an OH functional group-containing ionic liquid IL-OH8 was used in place of an OH functional group-containing ionic liquid IL-OH2.

Example A6

A spectacle lens was obtained according to the same procedure as in Example A3 except that an OH functional group-containing ionic liquid IL-OH8 was used in place of an OH functional group-containing ionic liquid IL-OH2.
<Evaluation>

The spectacle lens obtained in each of the above Examples and Comparative Examples and an antireflection film-containing spectacle lens described later were evaluated as below. The results are summarized in Table 1 described later.
(Surface Resistivity 1)

The surface resistivity of the spectacle lens was measured using Hiresta UP MCP-HT450 (Mitsubishi Chemical Analytech Co., Ltd.) as a surface resistivity meter. Specifically, an electrode was applied to the surface of the hard coat of the spectacle lens at a right angle, and a voltage of 500 V was applied thereto. After the electrode was applied for 30 seconds, a value measured at the 30th second was taken as the surface resistivity.
(Surface Resistivity 2)

The surface resistivity of an antireflection film-containing spectacle lens was measured using Hiresta UP MCP-HT450 (Mitsubishi Chemical Analytech Co., Ltd.) as a surface resistivity meter. Specifically, an electrode was applied to the surface of an antireflection film of an antireflection film-containing spectacle lens prepared in (Adhesion) evaluation described later at a right angle, and a voltage of 500 V was applied thereto. After the electrode was applied for 30 seconds, a value measured at the 30th second was taken as the surface resistivity.
(Adhesion)

The adhesion was evaluated by a cross cut tape test according to JIS K5600.

Specifically, first, an antireflection film was formed on a hard coat layer according to the procedure of (Formation of Antireflection Film) described later to obtain an antireflection film-containing spectacle lens.

Next, the surface of the antireflection film of the antireflection film-containing spectacle lens was cut to reach the plastic spectacle lens base using a knife at intervals of 1 mm, and thus, 100 squares were formed. Next, a scotch tape (manufactured by 3M Company) was strongly pressed against the cut antireflection film. Thereafter, the scotch tape was quickly pulled toward a direction of 60° from the surface of the antireflection film with a load of 4 kg, and peeled off. Then, the number of squares remaining on the plastic spectacle lens base was counted.

(Formation of Antireflection Film)

The obtained spectacle lens was set on a rotatable dome provided in a vacuum chamber. A temperature in the vacuum chamber was increased to 70° C., and air was discharged to reach a pressure of $1.0 \times 10^{-3}$ Pa. Next, one of the hard coat layers was subjected to Ar ion beam cleaning for 60 seconds under conditions of an accelerating voltage of 500 V and an accelerating current of 100 mA. Thereafter, a first layer $SiO_2$ (refractive index: 1.47) with an optical thickness of $0.090\lambda$, a second layer $ZrO_2$ (refractive index: 2.00) with an optical thickness of $0.038\lambda$, a third layer $SiO_2$ (refractive index: 1.47) with an optical thickness of $0.393\lambda$, a fourth layer $ZrO_2$ (refractive index: 2.00) with an optical thickness of $0.104\lambda$, a fifth layer $SiO_2$ (refractive index: 1.47) with an optical thickness of $0.069\lambda$, a sixth layer $ZrO_2$ (refractive index: 2.00) with an optical thickness of $0.289\lambda$, and a seventh layer $SiO_2$ (refractive index: 1.47) with an optical thickness of $0.263\lambda$ were sequentially laminated on the cleaned hard coat layer, thereby forming an antireflection film. $\lambda$ denoting the central wavelength in the design was set to 500 nm.

The other hard coat layer was also subjected to the same treatment as described above to form the antireflection film on each of both surfaces of the spectacle lens, thereby obtaining an antireflection film-containing spectacle lens.

(Scratch Resistance)

The surface of the antireflection film in the antireflection film-containing spectacle lens prepared in the above (Adhesion) Evaluation was rubbed with BONSTER #0000 steel wool (manufactured by Nippon Steel Wool Co., Ltd.) back and forth 50 times under a load of 2 kg, and the degree of scratches in the surface (1 cm×3 cm) of the hard coat layer was visually evaluated and rated as follows.

○: Excellent (no scratches are observed)

Δ: Good (less than 30 shallow scratches are observed, which cause no practical problem)

x: Poor (more than 30 scratches are observed, which cause a practical problem)

(Luminous Transmittance)

The luminous transmittance of the antireflection film-containing spectacle lens prepared in the above (Adhesion) Evaluation was measured using an LED transmittance meter, LDM-200, manufactured by FUJIKODEN CORP.

In Table 1, a "metal" means a metal nanowire or metal nanoparticles used, and AgNW means a silver nanowire.

In Table 1, an "ionic liquid" represents the type of an ionic liquid used.

In Table 1, a "metal concentration (% by mass)" represents the content of the "metal" with respect to the total mass of the hard coat layer. In Table 1, the metal concentration represents the content of the silver nanowire with respect to the total mass of the hard coat layer.

In Table 1, an "ionic liquid concentration (% by mass)" represents the content of the "ionic liquid" with respect to the total mass of the hard coat layer.

In Table 1, "presence or absence of coating" shows whether or not the ionic liquid coats the metal nanowire or the metal nanoparticles indicated in the "metal". When coating, "present" is shown, while when not coating, "absent" is shown.

In Table 1, a "film thickness (μm)" represents the film thickness of the hard coat layer.

In Table 1, "1.0E15<" means more than 1.0E15.

TABLE 1

| | Hard coat layer | | | | | Evaluation | | | | |
|---|---|---|---|---|---|---|---|---|---|---|
| | Metal | Ionic liqind | Metal concentration (% by mass) | Ionic liquid concentration (% by mass) | Presence or absence of coating | Film thickness (μm) | Surface resistivity 1 (Ω/sq) | Surface resistivity 2 (Ω/sq) | Adhesion | Scratch resistance | Luminous transmittance (%) |
| Comparative Example A1 | — | IL-OH2 | — | 1.9 | — | 13.5 | 5E+14 | 6E+14 | 100/100 | ○ | 90.2 |
| Comparative Example A2 | AgNW | — | 4.6 | — | — | 16.3 | 1.0E15< | 8E+14 | 100/100 | ○ | 42.5 |
| Comparative Example A3 | AgNW | IL-OH2 | 4.5 | 1.8 | Absent | 15.2 | 2E+14 | 4E+14 | 100/100 | ○ | 43.8 |
| Example A1 | AgNW | IL-OH2 | 4.5 | 1.8 | Present | 16.2 | 5E+07 | 3E+08 | 100/100 | ○ | 90.5 |
| Example A2 | AgNW | | 4.4 | 4.4 | Present | 14.5 | 5E+07 | 3E+08 | 100/100 | ○ | 90.1 |
| Example A3 | AgNW | | 4.2 | 8.4 | Present | 14.8 | 7E+07 | 2E+08 | 100/100 | ○ | 90.6 |
| Example A4 | AgNW | IL-OH8 | 4.5 | 1.8 | Present | 13.7 | 7E+08 | 3E+09 | 100/100 | ○ | 85.3 |
| Example A5 | AgNW | | 4.4 | 4.4 | Present | 15.8 | 3E+08 | 4E+09 | 100/100 | ○ | 86.4 |
| Example A6 | AgNW | | 4.2 | 8.4 | Present | 18.0 | 2E+08 | 9E+08 | 100/100 | ○ | 84.6 |

As shown in Table 1, the predetermined spectacle lens was confirmed to provide a desired effect.

Comparative Example B1

A spectacle lens was obtained according to the same procedure as in Comparative Example A2 except that silver nanoparticles (φ2-3.5 μm, 327085, Sigma-Aldrich) (5 parts by mass) were used in place of a silver nanowire of a silver nanowire solution (excluding a solvent) (ACS Materials, Agnw-L30) (5 parts by mass).

Comparative Example B2

A spectacle lens was obtained according to the same procedure as in Comparative Example B1 except that an OH functional group-containing ionic liquid IL-OH2 (10 parts by mass) and silver nanoparticles ((2-3.5 µm, 327085, Sigma-Aldrich) (5 parts by mass) were used in place of a silver nanowire.

In Comparative Example B2, the ionic liquid and the silver nanoparticles are used, but the ionic liquid does not coat the silver nanoparticles.

Example B1

A spectacle lens was obtained according to the same procedure as in Comparative Example B1 except that ionic liquid-coated silver nanoparticles (15 parts by mass) prepared by the procedure described later were used in place of a silver nanowire.

(Production of Ionic Liquid-Coated Silver Nanoparticles)

Silver nanoparticles (1.8 parts by mass) (p 2-3.5 µm, 327085, Sigma-Aldrich), a 1 mol/l nitric acid aqueous solution (9 parts by mass), and an OH functional group-containing ionic liquid IL-OH2 (3.6 parts by mass) were mixed, and stirred at 75° C. for 1 hour. Next, water was entirely evaporated from the obtained solution to obtain ionic liquid-coated silver nanoparticles as a residue.

The obtained spectacle lens was subjected to the <Evaluation> described above. The results are summarized in Table 2.

In Table 2, "AgNP" represents silver nanoparticles.

(3 parts by mass), and 1-ethyl-3-methylimidazolium bis(trifluoromethanesulfonium)imide (hereinafter, also referred to as "Im-IL") (manufactured by Koei Chemical Co., Ltd.) (2 parts by mass) were mixed to obtain a hard coat layer-forming composition 2.

The hard coat layer-forming composition 2 (1.5 ml) was dropped on the primer layer, and a plastic spectacle lens base to which the hard coat layer-forming composition 2 had been applied was then rotated at 1000 rpm for 10 seconds by spin coating. Next, the obtained plastic spectacle lens base was heated at 90° C. for 10 minutes, and the coating film was then irradiated with UV (cumulative amount of light: 1.6 J/cm$^2$) using a high-pressure mercury lamp (100 mW/cm$^2$) as a light source to form a hard coat layer.

The other surface of the plastic spectacle lens base was also subjected to the same treatment as described above to obtain a spectacle lens including the hard coat layer disposed on each of both surfaces of the plastic spectacle lens base.

Comparative Example C2

A spectacle lens was obtained according to the same procedure as in Comparative Example C1 except that Im-IL (2 parts by mass) and Au nanoparticles (Sigma-Aldrich, product number: 636347) (5 parts by mass) were used in place of Im-IL (2 parts by mass).

In Comparative Example C2, the ionic liquid and the gold nanoparticles are used, but the ionic liquid does not coat the gold nanoparticles.

The average particle size of the Au nanoparticles was 100 nm.

Example C1

A spectacle lens was obtained according to the same procedure as in Comparative Example C1 except that ionic

TABLE 2

| | | Hard coat layer | | | | Evaluation | | |
| --- | --- | --- | --- | --- | --- | --- | --- | --- |
| | Metal | Ionic liquid | Metal cocentration (% by mass) | Ionic liquid concentration (% by mass) | Presence or absence of coating | Film thickness (µm) | Surface resistivity 1 (Ω/sq) | Adhesion | Scratch resistance |
| Comparative Example B1 | AgNP | — | 4.6 | — | — | 15.2 | 1.0E15< | 100/100 | ○ |
| Comparative Example B2 | AgNP | IL-OH2 | 4.2 | 8.4 | Absent | 14.5 | 4E+13 | 100/100 | ○ |
| Example B1 | AgNP | IL-OH2 | 4.2 | 8.4 | Present | 11.8 | 5E+10 | 100/100 | ○ |

As shown in Table 2, the predetermined spectacle lens was confirmed to provide a desired effect.

Comparative Example C1

A primer layer was formed according to the same procedure as in Comparative Example A1.

Methacrylic silsesquioxane (AC-SQ TA-100, manufactured by Toagosei Co., Ltd.) (50 parts by mass) as a silsesquioxane having a radical polymerizable group, 1-methoxy-2-propanol (50 parts by mass), IRGACURE 127 (photopolymerization initiator, manufactured by BASF AG)

liquid-coated Au nanoparticles 1 (7 parts by mass) prepared by the procedure described later were used in place of Im-IL (2 parts by mass).

(Production of Ionic Liquid-Coated Au Nanoparticles 1)

Au nanoparticles (Sigma-Aldrich, product number: 636347) (5 parts by mass), Im-IL (2 parts by mass), and pure water (50 parts by mass) were mixed, and stirred at 75° C. for 1 hour. Water was entirely evaporated from the obtained solution to obtain ionic liquid-coated Au nanoparticles 1 as a residue.

The obtained spectacle lens was subjected to the <Evaluation> described above. The results are summarized in Table 3.

In Table 3, "AuNP" represents gold nanoparticles.

TABLE 3

| | | Hard coat layer | | | | | Evaluation | | |
| --- | --- | --- | --- | --- | --- | --- | --- | --- | --- |
| | Metal | Ionic liquid | Metal cocentration (% by mass) | Ionic liquid concentration (% by mass) | Presence or absence of coating | Film thickness (μm) | Surface resistivity 1 (Ω/sq) | Adhesion | Scratch resistance |
| Comparative Example C1 | — | Im-IL | — | 3.6 | — | 5.2 | 1.0E15 < | — | — |
| Comparative Example C2 | AuNP | Im-IL | 8.3 | 3.3 | Absent | 3.8 | 1.0E15 < | — | — |
| Example C1 | AuNP | Im-IL | 8.3 | 3.3 | Present | 5.1 | 1E+11 | — | — |

As shown in Table 3, the predetermined spectacle lens was confirmed to provide a desired effect.

Comparative Example D1

(Formation of Primer Layer)

Pure water (289 parts by mass), propylene glycol monomethyl ether (10.6 parts by mass), L77 (manufactured by Momentive) (0.2 parts by mass) and L7604 (manufactured by Dow Chemical Company) (0.2 parts by mass) as surfactants, and an OH functional group-containing ionic liquid IL-OH9 (di(hydroxyethyl)oleylmethylammonium=bis(trifluoromethanesulfonyl)imide, manufactured by Koei Chemical Co., Ltd.) (3 parts by mass) were added to an aqueous urethane dispersion (EVAFANOL HA170, manufactured by Nikka Chemical Co., Ltd., solid content concentration: 37%) (200 parts by mass), followed by stirring to prepare a primer layer-forming composition 2 having a solid content concentration of 15% by mass.

As a plastic spectacle lens base, a lens having a refractive index of 1.60 (Nikon Lite 3AS material S0.00D, manufactured by Nikon-Essilor Co., Ltd.) was used.

The plastic spectacle lens base was dipped in the primer layer-forming composition 2 at 90 mm/min, and fired at 90° C. for 20 minutes to form a primer layer.

(Formation of Hard Coat Layer)

Acid phosphoxyethyl methacrylate (Phosmer M, manufactured by UNICHEMICAL CO., LTD.) (6 parts by mass), methacrylic silsesquioxane (AC-SQ TA-100, manufactured by Toagosei Co., Ltd.) (15 parts by mass) as a silsesquioxane having a radical polymerizable group, a zirconium dioxide dispersion liquid (manufactured by Kanto Denka Kogyo Co., Ltd.) (185 parts by mass) (40% by mass zirconium dioxide nanoparticles/propylene glycol monomethyl ether dispersion liquid, zirconium dioxide solid content (74 parts by mass)) as metal oxide particles, polyethylene glycol dimethacrylate (LIGHT-ACRYLATE 4EG-A, manufactured by Kyoeisha Chemical Co., Ltd.) (5 parts by mass), and IRGACURE 127 (photopolymerization initiator, manufactured by BASF AG) (3 parts by mass) were mixed to obtain a hard coat layer-forming composition C2.

The hard coat layer-forming composition C2 (1.5 ml) was dropped on the primer layer, and the plastic spectacle lens base to which the hard coat layer-forming composition C2 had been applied was then rotated at 1000 rpm for 10 seconds by spin coating. Next, the obtained plastic spectacle lens base was heated at 90° C. for 10 minutes, and the coating film was then irradiated with UV (cumulative amount of light: 1.6 J/cm$^2$) using a high-pressure mercury lamp (100 mW/cm$^2$) as a light source to form a hard coat layer.

The other surface of the plastic spectacle lens base was also subjected to the same treatment as described above to obtain a spectacle lens including the hard coat layer disposed on each of both surfaces of the plastic spectacle lens base.

Example D1

A spectacle lens was obtained according to the same procedure as in Comparative Example D1 except that a metal concentration and an ionic liquid concentration were adjusted as described in Table 4 using ionic liquid-coated Au nanoparticles 2 prepared by the procedure described later in place of an OH functional group-containing ionic liquid IL-OH9 (3 parts by mass).

(Production of Ionic Liquid-Coated Au Nanoparticles 2)

Au nanoparticles (Sigma-Aldrich, product number: 636347) (10 parts by mass), an OH functional group-containing ionic liquid IL-OH9 (4 parts by mass), and pure water (50 parts by mass) were mixed, and stirred at 75° C. for 1 hour. Water was entirely evaporated from the obtained solution to obtain ionic liquid-coated Au nanoparticles 2 as a residue.

The obtained spectacle lens was subjected to the <Evaluation> described above. The results are summarized in Table 4.

In Table 4, a "metal concentration (% by mass)" represents the content of the "metal" with respect to the total mass of a primer layer. In Table 1, the metal concentration represents the content of the gold nanoparticles with respect to the total mass of the primer layer.

In Table 1, an "ionic liquid concentration (% by mass)" represents the content of the "ionic liquid" with respect to the total mass of the primer layer.

TABLE 4

| | | Primer layer | | | | Hard coat layer | Evaluation |
|---|---|---|---|---|---|---|---|
| | Metal | Ionic liquid | Metal concentration (% by mass) | Ionic liquid concentration (% by mass) | Presence or absence of coating | Film thickness (μm) | Film thickness (μm) | Surface resistivity 1 (Ω/sq) |
| Comparative Example D1 | — | IL-OH9 | — | 3.9 | — | 1.2 | 18.5 | 1.0E15 < |
| Example D1 | AuNP | IL-OH9 | 8.5 | 3.4 | Present | 1.2 | 18.5 | 7E+12 |

As shown in Table 4, the predetermined spectacle lens was confirmed to provide a desired effect.

REFERENCE SIGNS LIST 10A, 10B spectacle lens
12 spectacle lens base
14A, 14B hard coat layer
16 primer layer

The invention claimed is:

1. A spectacle lens comprising:
a spectacle lens base; and
a hard coat layer,
wherein when a primer layer is included between the spectacle lens base and the hard coat layer, at least one of the primer layer and the hard coat layer contains at least one conductive filler selected from the group consisting of an ionic liquid-coated nanowire containing a metal nanowire and an ionic liquid coating the metal nanowire, and ionic liquid-coated nanoparticles containing metal nanoparticles and an ionic liquid coating the metal nanoparticles, and
when the primer layer is not included between the spectacle lens base and the hard coat layer, the hard coat layer contains the at least one conductive filler selected from the group consisting of the ionic liquid-coated nanowire and the ionic liquid-coated nanoparticles.

2. The spectacle lens according to claim 1, wherein the ionic liquid contains at least one selected from the group consisting of an ammonium salt, an imidazolium salt, a pyridinium salt, a pyrrolidinium salt, a phosphonium salt, and a sulfonium salt.

3. The spectacle lens according to claim 1, wherein a metal contained in the metal nanoparticles and the metal nanowire contains at least one selected from the group consisting of silver, gold, copper, nickel, and platinum.

4. The spectacle lens according to claim 1,
wherein the hard coat layer contains the at least one conductive filler, and
the hard coat layer is formed by using a hard coat layer-forming composition containing a polymerizable monomer and the at least one conductive filler.

5. The spectacle lens according to claim 4, wherein the polymerizable monomer contains (meth)acrylate having at least one group selected from the group consisting of a phosphate group and a sulfonate group.

6. The spectacle lens according to claim 4, wherein the polymerizable monomer contains silsesquioxane having a radical polymerizable group.

7. The spectacle lens according to claim 1, further comprising an antireflection film disposed on the hard coat layer.

8. A spectacle lens comprising:
a spectacle lens base; and
a composition applied to the spectacle lens base and comprising at least one conductive filler selected from the group consisting of ionic liquid-coated nanoparticles containing metal nanoparticles and an ionic liquid coating the metal nanoparticles, and an ionic liquid-coated nanowire containing a metal nanowire and an ionic liquid coating the metal nanowire.

9. The spectacle lens according to claim 8, wherein the composition further comprising a polymerizable monomer.

10. The spectacle lens according to claim 9, wherein the polymerizable monomer contains (meth)acrylate having at least one group selected from the group consisting of a phosphate group and a sulfonate group.

11. The spectacle lens according to claim 9, wherein the polymerizable monomer contains silsesquioxane having a radical polymerizable group.

* * * * *